United States Patent [19]

Akesson

[11] 4,354,428
[45] Oct. 19, 1982

[54] SPRING ASSEMBLY SYSTEM

[75] Inventor: Ingve R. Akesson, Helsingborg, Sweden

[73] Assignee: Societe d'Assistance Technique Pour Produits Nestle, S.A., Lausanne, Switzerland

[21] Appl. No.: 202,681

[22] Filed: Oct. 31, 1980

[30] Foreign Application Priority Data

Nov. 15, 1979 [SE] Sweden ............................. 7909426

[51] Int. Cl.³ ............................................. A23N 15/02
[52] U.S. Cl. ........................................ 99/639; 99/643
[58] Field of Search ................. 99/546, 635, 637–643; 193/47, 48, 44

[56] References Cited

U.S. PATENT DOCUMENTS

| 3,400,740 | 9/1968 | Akesson | 99/638 |
| 3,601,171 | 8/1971 | Farrow | 99/637 |

FOREIGN PATENT DOCUMENTS 1404593 9/1975 United Kingdom .................. 99/641

Primary Examiner—Philip R. Coe
Assistant Examiner—Timothy F. Simone
Attorney, Agent, or Firm—Vogt & O'Donnell

[57] ABSTRACT

Figure 1:
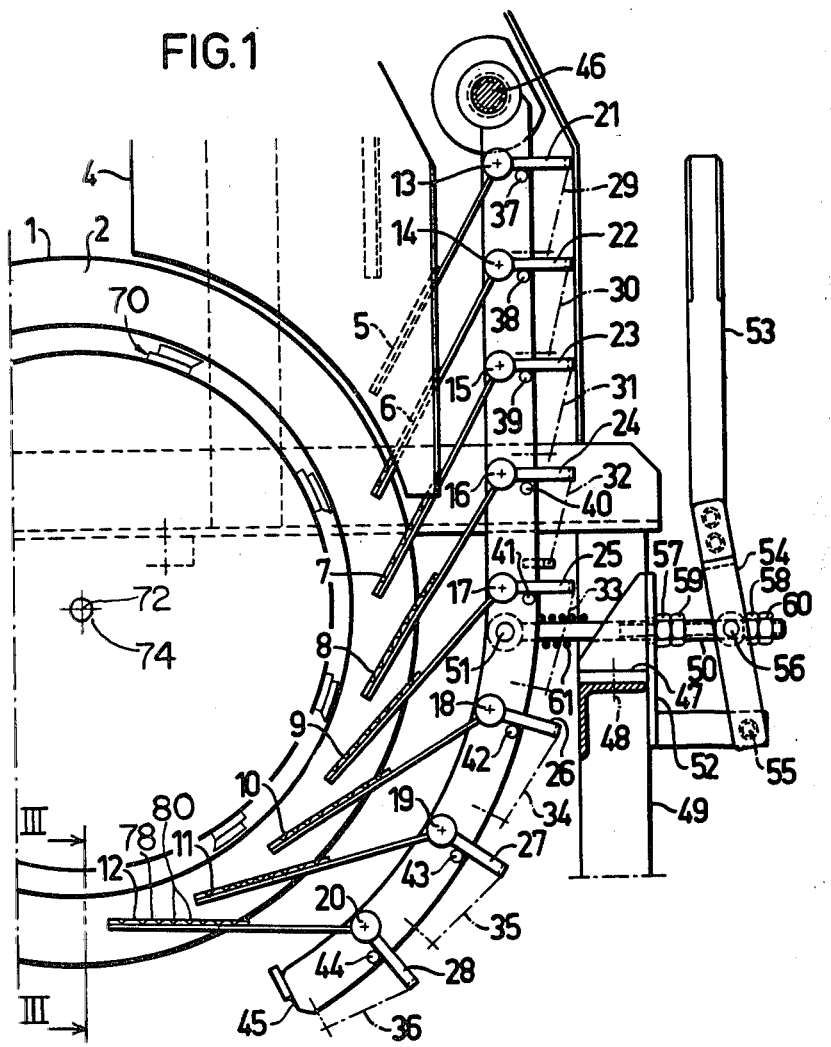

The invention relates to a device in a machine for trimming vegetables, especially Brussels sprouts, by means of a rotary cutter forming the bottom of a trapezoidal groove (3), which is formed by the inclined sides (2) of a pair of rotary flanges, the vegetables being caused by the action of the rotary flanges and stationary holding means (5-12) to perform a rotary movement around themselves at the same time as they follow the rotary flanges in the groove (3) between them, and projecting parts of the vegetables are exposed to the cutter and trimmed off. According to the invention the holding means consists of a number of substantially planar plates (5-12), which are arranged resiliently and elastically pivotable around axes (13-20), which are substantially parallel to the rotary shaft of the cutter and of the flanges, which overlap each other like roof tiles substantially along the groove (3) between the flanges with the free ends of the plates pointing in the direction of rotation, and which form a ceiling of the groove along a part thereof (FIG. 1).

10 Claims, 3 Drawing Figures

SPRING ASSEMBLY SYSTEM

In the trimming of Brussels sprouts, the stem linking the sprout to the stalk is usually severed and one or more of the outer leaves are removed, as they are often hard and stained.

Swedish Pat. No. 320,536 (corresponding to U.S. Pat. No. 3,400,740 and French Pat. No. 1,486,260) shows a machine for trimming vegetables, especially Brussels sprouts. This machine comprises a combination of a movable cutter and a channel which is parallel to the path of the cutter and consists of guiding means forming a groove and holding means, one of said means being movable relative to the other to impart a rolling movement of the vegetables around themselves and a simultaneous sliding movement of them along the channel, and is characterized in that the rotary cutter and the channel formed by the guiding means and the holding means have at least one part which is concentric with the circular path described by the rotary cutter.

The cutter preferably consists of a wheel, the periphery of which is provided with cutting blades, and the guiding means of two flanges, which surround the wheel and are each provided with a plane inclined towards the wheel so that the channel will have a trapezoidal cross section. The two flanges are preferably also arranged to rotate in the same direction as the wheel but at a considerably lower angular velocity. The distance between the two flanges can be varied to be accomodated to vegetables of different sizes.

According to the patent, the holding means preferably consists of a stationary slide in the form of a peripheral sector, the inner side of which forms the ceiling of the channel and is coated with a layer of a soft and resilient material, such as a foam rubber or foamed plastic. As the vegetables are squeezed in the trapezoidal channel between the inclined planes of the rotary flanges and the resilient ceiling, which does not take part in the rotary movement, a rotary movement around themselves will be imparted to them, simultaneously as they are brought along in the movement of the groove along the periphery of the flanges. During this composite movement, the vegetables will in most cases at least once get into such a position that their stalk end is facing the bottom of the channel and protrudes so far between the flanges that the cutting blades of the rotary cutter can reach it and cut off the projecting stalk portion together with one or more of the outermost blades, the attachments of which are located near the bottom end of the stalk. The trimmed vegetables are then separated from loose stalks and leaves in a separate apparatus.

It has been found that a machine according to the above gives excellent results in use, but it has also turned out that it can be improved in some respects. This applies especially to the holding means, which is intended to press the vegetables resiliently into the channel formed by the flanges of the guiding means so that the vegetables are really caused to roll around themselves and the stalk end is then brought into contact with the cutter.

In the embodiment usually employed, the holding means has consisted of a stationary slide, which forms a rim sector, and the elastic resilience has been achieved by arranging a relatively thick layer of foam plastic or foam rubber to the inside of the stationary slide, which layer has then formed the ceiling of the channel. However, it has been found that when the vegetables are rubbed against the plastic or rubber material in the relatively moist environment, the material rubbed off will after some time make the plastic or rubber material very slippery, so that it cannot any longer provide the friction required to impart the necessary rolling movement to the vegetables. This requires a frequent cleaning of the material, which makes it necessary to dismantle the apparatus.

Moreover, clogging may sometimes occur, when two or more heads of Brussels sprouts get jammed simultaneously in the groove between the flanges of the guiding means. With the equipment so far used, this will also make it necessary to dismantle the apparatus, requiring a great amount of time.

Finally, it is desirable to be able to adjust the distance between the holding means and the groove between the flanges of the guiding means to adapt the apparatus to different size classes of vegetables. This is also difficult to do in the previously known apparatus, which is not adapted to be easily changed in this respect.

The disadvantages indicated above are eliminated by the present invention. According to the invention the holding means in a machine of the type indicated above and intended for trimming of vegetables is embodied as a number of substantially planar plates, which are arranged resiliently pivotable around shafts parallel to the axis of rotation of the cutter and form the ceiling of the channel, whereby they overlap each other like roof tiles substantially along a part of the groove formed by the guiding means and concentric with the circular path of the cutter, with the free ends of the plates pointing in the direction of rotation.

Figure 3:
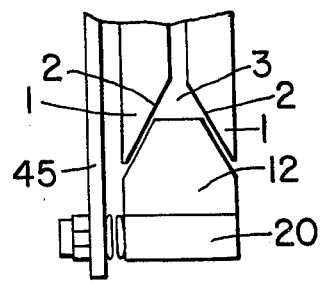

The invention is illustrated in more detail by the accompanying drawings showing a preferred embodiment. In the drawing, FIG. 1 shows a view of the device according to the invention, as a cross-sectional view along a line I—I in FIG. 2, and FIG. 2 a schematic front view of the device FIG. 3 shows a sectional view taken along line III—III in FIG. 1.

Figure 2:
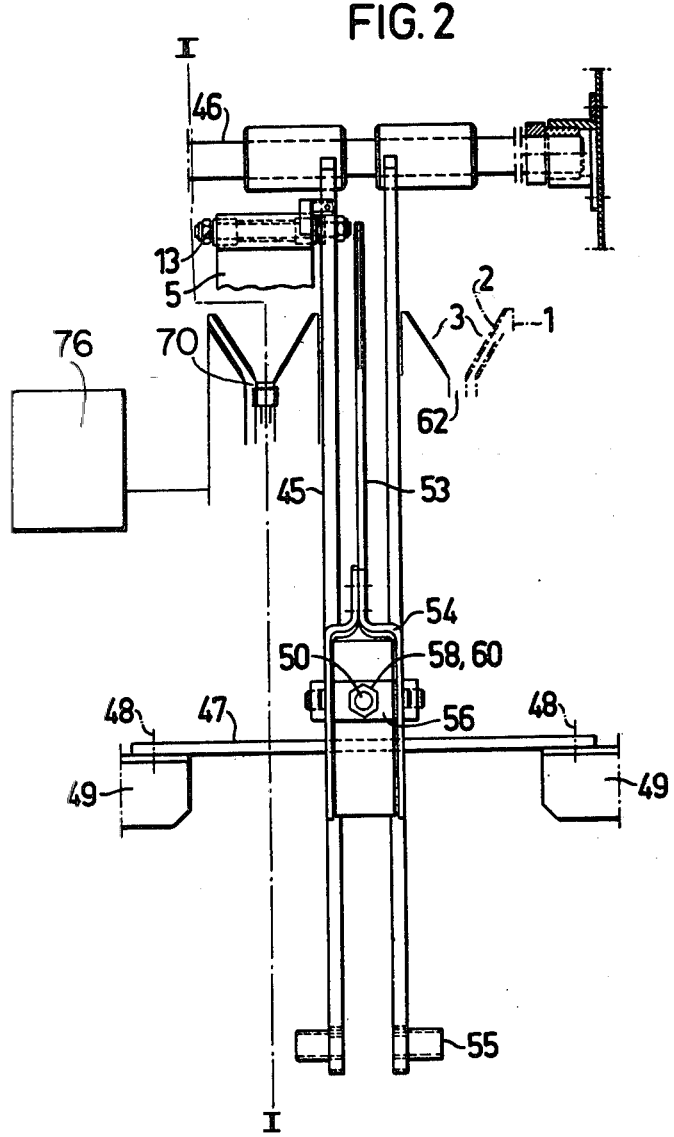

In FIG. 1, one of the rotary flanges forming the guiding means is schematically indicated at 1, together with the inclined plane 2 forming a wall in the trapezoidal groove 3 (FIG. 2). The cutter 70 is rotated in the clockwise direction, as seen in FIG. 1 about cutter axis 72 by shaft 74. The guiding means is rotated about the same axis in the same direction, but at a lower rotational speed than the cutter, by rotating means schematically depicted at 76 (FIG. 2). The vegetables are fed to the device through a hopper, which is indicated at 4, and enter the trapezoidal space between the flanges, following these in their rotation. In order to bring along the vegetables more easily in their rotation, the inclined planes of the flanges are preferably provided with radial grooves or ridges to increase the friction.

The holding means forming the inner ceiling of the channel 3 consists of a number of substantially planar plates 5–12. These are rotatably attached to fixed shafts 13–20, which are substantially parallel to the axis of rotation of the cutter and the rotary flanges. As radial arms 21–28 are also attached to the shafts 13–20, which arms are rigidly connected to the respective plates and attached to draw springs 29–36, the turning of the plates will be resiliently elastic, and the inward turning of the plates towards the channel between the flanges is limited by stop pins 37–44. The plates are preferably planar but can also be somewhat bent to be adapted to the peripheral groove between the flanges.

The shafts 13–20 with the plates attached thereto and the radial arms are arranged on a holding device, which is designed as a holding arm 45 pivotable around a shaft 46, which is substantially parallel to the axis of rotation of the cutter and the flanges.

A draw bar 50 is also hingedly connected to the holding arm through the shaft 51. The draw bar passes through a guiding plate 52 attached to a cross piece 47 and is at its other end articulatedly connected to the lever 54, which at its connection to the draw bar is shaped like a yoke 54, the attaching point 55 of which to the cross piece 47 is the turning point of the lever.

The draw bar 50 pssses through a cross piece 56 on the yoke and is threaded in this end portion and provided with the nuts 57 and 58 with their associated locking nuts 59 and 60. The draw bar 50 and the holding arm 45 with its associated plates are pressed by the compression spring 61 against the channel 3 between the flanges, and it is possible to adjust the position of the holding arm by means of the nut 57 with its locking nut 59. The position of the lever can be adjusted by means of the nut 58 with its locking nut 60. The cross piece 47 is attached to the holding arm, which piece is detachably secured to the stand 49 of the machine by means of bolts 48 or other means of attachment.

In FIG. 2 a schematical front view of the device of the invention is shown (from the right according to FIG. 1). Here are shown two pairs of rotary flanges 1 with their inclined planes 2, which form the trapezoidal channel 3. During the rolling movement the stalk of the vegetables can be caused to protrude through the aperture 62 in the bottom of the channel so that it can be cut off by the rotary cutter. One of the movable plates 5 is indicated with its shaft 13, attached to the holding arm 45 with its corresponding shaft 46. The holding arm is detachably attached to the stand of the machine through the crosspiece 47, part of which stand is shown at 49. The draw bar 50 is also attached to the holding arm, which bar in its turn is attached to the yoke 54 of the lever 53 by means of the crosspiece 56 and the nuts 58 and 60.

It is shown in the drawing how two series of plates of two guiding means are operated via two holding arms by means of a common lever. This is suitable in practice but is not strictly necessary for the function of the device. It is equally possible to operate by a lever only one set of plates of one single guiding device or to operate more than two sets of plates by means of one lever.

The distance between the plates and the channel in the guiding means can be easily adjusted by turning the nut 57, which can be secured by the locking nut 59, after which it is kept constant by the force of the compression spring 61. Therefore, the compression spring 61 should have a spring force which is considerably greater than the spring force of the springs 29–36, which press the plates against the flanges. Thus, it is easy to adjust the apparatus for treatment of vegetables of different size categories. Nor does the set position change with time, as is the case with the previously known holding means.

By pulling the lever 53 outwards towards the compression spring 61 the holding arm 45 and all the plates are moved a short way out of the channel 3. In this way the space in and over the channel is enlarged, and possible clogging caused by several vegetables being jammed in the channel at the same time can easily be removed and disappear the normal way downwards. When the lever is then released the holding arm and the plates return to their pre-set position.

By loosening the bolts 48, the crosspiece 47 is released from its attachment to the stand and consequently also the holding arm 45. This arm can now be pivoted around the shaft 46 with the plates accompanying it. In this way, the plates and also the flanges of the guiding means will be easily available for examination, cleaning and overhaul. When the holding arm is then again attached to the stand via the crosspiece, the same setting of the distance between the plates and the channel in the guiding means as before is resumed an no new adjustment has to be made.

The movable plates 5–12 are preferably shaped at their ends in such a way that they follow the contour of the trapezoidal groove 3. This arrangement is illustrated in FIG. 3, a framentary sectional view taken along line III—III in FIG. 1. However, no close adaptation is necessary, but a play of the order of a few mm is possible between the edges of the plates and the groove walls formed by the rotary flanges.

Moreover, on the side facing the trapezoidal groove the plates are coated with a friction increasing material 78 (FIG. 1), which is preferably also relatively soft in order not to damage the vegetables. A suitable material is a rubber or plastic mat which, however, need not be of a foam material as in the previously known device. To increase the friction, the material can also be provided with grooves 80 or provided with ridges, which extend substantially perpendicularly to the peripheral course of movement of the cutter and the rotary flanges. In this way, the rotary movement of the vegetables is enhanced.

The force by which the plates are pressed against the groove in the guiding means can be easily adjusted by selecting various types of draw springs 29–36. The spring force should be adjusted so that it is not too weak, in which case the rolling movement required is not obtained, or too strong, when the risk of clogging is increased. It is true that clogging can easily be removed by the device of the invention, but it means a reduction of the capacity of the apparatus. A suitable spring force can easily be set on the basis of simple routine tests.

The mere mechanical construction of the device of the invention is not difficult for one skilled in the art in view of what has been described in the foregoing. The embodiment and the operation of the rotary cutter and the rotary flanges in the guiding means, as well as the means for supply and discharge of the vegetables before and after trimming are similar to those taught in Swedish Pat. No. 320,536 (U.S. Pat. No. 3,400,740; French Pat. No. 1,486,260), to which has been referred above. Of course it must be considered that the construction and the materials of the apparatus must be such that foodstuffs can be treated in a way unreproachable from a hygienic point of view. Thus it must be possible to clean the apparatus in a simple way, e.g. by means of high pressure washing. In this respect the invention brings considerable advantages in comparison with the previously known device, in which a holding means of foam rubber or foam plastic has been used.

Such materials are always very difficult to clean, as impurities easily remain in the cells or pores of the material. Moreover, it is much easier in the present device to reach the parts being in contact with the vegetables, as the whole set of plates and their holders can be easily swung aside.

In the present specification and drawing an embodiment of the device has been shown in which 8 resilient plates are used. However, it is to be realized that this number can be varied depending on the size of the apparatus and other factors. It has been found suitable with 8 plates for a machine adapted to trim Brussels sprouts.

The resilient attachment of the rotatable plates shown is also only an example. It is also possible e.g. to use spiral springs in connection with the turning axes of the plates instead of the radial arms and the draw springs shown, in a way which is clearly apparent to one skilled in the art. Also other variants and modifications of the invention are possible within the scope of the claims.

By the present invention there are provided new holding means for a machine of a previously known type, whereby several essential advantages are obtained. Thus, the apparatus can be easily set for vegetables of a definite size class, and this setting is not changed if the device is dismantled for overhaul, but remains unchanged after assembly. Occasional clogging in the apparatus can be readily eliminated without dismantling, and dismantling can be carried out in a very simple way which also brings advantages from a hygienic point of view.

I claim:

1. A device for trimming vegetables, especially Brussels sprouts, of the type having:
   (a) a frame;
   (b) a cutter;
   (c) means for rotating said cutter about a cutter axis to move said cutter relative to said frame along a predetermined circular path;
   (d) guiding means having an annular groove on its periphery, said groove being concentric with the path of said cutter and juxtaposed therewith;
   (e) means for depositing vegetables into said grooves in engagement with said guiding means;
   (f) means for rotating said guiding means about said cutter axis to advance the periphery of said guiding means relative to said frame in a downstream direction and thereby advance vegetables in said groove; and
   (g) holding means for engaging vegetables advanced by said guiding means to rotate such vegetables during such advancement for engagement with said cutter, said holding means being retained against movement in said downstream direction,
   characterized in that said holding means includes a plurality of plates confronting said groove, each such plate being mounted for pivoting movement relative to said frame about an associated pivot axis parallel to said cutter axis, each such plate having a free end remote from the pivot axis of such plate, the free end of each such plate being disposed downstream of the pivot axis of such plate, said plates overlapping one another, said holding means further including means for biasing each of said plates about its pivot axis to urge the free end of such plate towards said guiding means so that the free ends of said plates will engage vegetables advanced by said guiding means.

2. The device as claimed in claim 1, characterized in that said means for rotating said guiding means is operative to rotate said guiding means in the same direction as the cutter and at a lower angular speed than the cutter.

3. The device as claimed in claim 1 or claim 2, characterized in that the free ends of the plates are shaped so that they substantially conform to the contour of the groove.

4. A device as claimed in claim 3 characterized in that said groove is trapezoidal in cross-section.

5. The device as claimed in claim 3, characterized in that the surfaces of the plates confronting the groove are covered with a friction increasing material.

6. The device as claimed in claim 5, characterized in that said friction increasing material is grooved transversely to the peripheral direction of motion of the guiding means.

7. A device as claimed in claim 1, further comprising a support, all of said plates being pivotally mounted to said support, said support being mounted to said frame for movement towards and away from said guiding means, and means for retaining said support in a predetermined position during operation of the device, said retaining means being selectively operable to permit movement of said support away from said guiding means for servicing.

8. A device as claimed in claim 7 characterized in that said support is mounted to said frame for pivoting motion about an axis parallel to said cutter axis but remote therefrom.

9. A device as claimed in claim 7 characterized in that said retaining means includes means for adjusting said predetermined position of said support to thereby adjust the distances between said plates and said guiding means.

10. A device as claimed in claim 9 characterized in that said retaining means includes means for biasing said support towards said guiding means and adjustable stop means engageable with said support and said frame to limit motion of said support towards said guiding means, said biasing means maintaining said stop means in engagement to thereby maintain said support in said predetermined position during operation of the device.

* * * * *

UNITED STATES PATENT AND TRADEMARK OFFICE
CERTIFICATE OF CORRECTION

PATENT NO. : 4,354,428
DATED : October 19, 1982
INVENTOR(S) : INGVE R. AKESSON

It is certified that error appears in the above—identified patent and that said Letters Patent is hereby corrected as shown below:

In the Title Page, "Helsingborg" should read --Hälsingborg--.
At column 3, line 15, "pssses" should read --passes--.
At column 4, line 13, "an no new" should read --and no new--.
At column 5, line 36, "grooves" should read --groove--.

Signed and Sealed this

Twenty-eighth Day of December 1982

[SEAL]

Attest:

GERALD J. MOSSINGHOFF

Attesting Officer    Commissioner of Patents and Trademarks